(12) United States Patent
Bao et al.

(10) Patent No.: US 9,690,855 B2
(45) Date of Patent: *Jun. 27, 2017

(54) METHOD AND SYSTEM FOR SEARCHING FOR A WEB DOCUMENT

(75) Inventors: Sheng Hua Bao, Beijing (CN); Jian Chen, Beijing (CN); Zhong Su, Beijing (CN); Rui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/549,416

(22) Filed: Jul. 14, 2012

(65) Prior Publication Data

US 2013/0018912 A1   Jan. 17, 2013

(30) Foreign Application Priority Data

Jul. 15, 2011   (CN) .......................... 2011 1 0198627

(51) Int. Cl.
*G06F 17/30* (2006.01)

(52) U.S. Cl.
CPC .............................. *G06F 17/30864* (2013.01)

(58) Field of Classification Search
CPC ......... G06F 17/30864; G06F 17/30873; G06F 17/30899; G06F 17/30902;
(Continued)

(56) References Cited

U.S. PATENT DOCUMENTS 7,200,804 B1 * 4/2007 Khavari et al. ................ 715/230
7,349,950 B2   3/2008 Stephens ........................ 709/217

(Continued)

FOREIGN PATENT DOCUMENTS

| CN | 101111836 A | 1/2008 | ............ G06F 11/302 |
| WO | WO 2010/114913 A1 | 10/2010 | ............... G06F 7/00 |

OTHER PUBLICATIONS

Punera, Kunal, and Srujana Merugu. "The anatomy of a click: modeling user behavior on web information systems." In Proceedings of the 19th ACM international conference on Information and knowledge management, pp. 989-998. ACM, 2010.*

(Continued)

*Primary Examiner* — Jason Liao
*Assistant Examiner* — Jesse P Frumkin
(74) *Attorney, Agent, or Firm* — Ido Tuchman; Jennifer R. Davis

(57) ABSTRACT

Provided is a method applied to a system including a plurality of sensors, a proxy, and a server. The method includes: measuring objects by the plurality of sensors to obtain first measurement values; computing a correlation among the first measurement values by the server based on the first measurement values; computing an actual measurement value of a second measurement value by the proxy based on the first measurement values and a given function; verifying the plurality of sensors by setting one or more sensors as verification target sensors in turn by the server at predetermined timing; computing a predicted value of the second measurement value by the server based on the correlation and the first measurement values obtained from the other sensors; and outputting the predicted value of the second measurement value instead of the actual measurement value thereof at least during the verification of the verification target sensors.

9 Claims, 5 Drawing Sheets

(58) Field of Classification Search
CPC ....... G06F 2203/04801; G06F 3/04812; G06F 3/04892; G06F 3/0481
USPC .......................................................... 706/48
See application file for complete search history.

(56) References Cited

U.S. PATENT DOCUMENTS

| | | | |
|---|---|---|---|
| 7,912,832 B2 | 3/2011 | Krieg et al. | 707/713 |
| 2003/0132957 A1* | 7/2003 | Ullmann et al. | 345/738 |
| 2004/0059809 A1* | 3/2004 | Benedikt et al. | 709/224 |
| 2004/0141016 A1* | 7/2004 | Fukatsu et al. | 345/856 |
| 2005/0120311 A1* | 6/2005 | Thrall | 715/811 |
| 2005/0204296 A1* | 9/2005 | Rossler et al. | 715/751 |
| 2005/0234848 A1* | 10/2005 | Lawrence et al. | 707/1 |
| 2008/0140626 A1 | 6/2008 | Wilson | 707/3 |
| 2008/0313115 A1 | 12/2008 | Galvin | 706/21 |
| 2008/0313123 A1* | 12/2008 | Galvin | 706/48 |
| 2009/0132551 A1 | 5/2009 | Allen et al. | 707/10 |
| 2009/0198662 A1 | 8/2009 | Prabhakar et al. | 707/3 |
| 2009/0216758 A1 | 8/2009 | Tuttle et al. | |
| 2011/0041140 A1* | 2/2011 | Harm et al. | 719/318 |
| 2012/0010920 A1* | 1/2012 | Yuan | 705/7.29 |
| 2012/0030190 A1 | 2/2012 | Lee et al. | 707/711 |
| 2013/0066848 A1* | 3/2013 | Tuttle et al. | 707/711 |

OTHER PUBLICATIONS

Dynamics of Dynamic Site Mapping, http://www.positivearticles.com/Article/Dynamics-of-Dynamic-Site-Mapping/30310, printed May 16, 2011.

Tom Halpin, Ajax Navigation, Dynamic Content and Search Engine Indexing, http://www.perigeeglobal.com/blog/2011/01/our-approach-to-search-engines-and-ajax-content/, printed May 16, 2011.

* cited by examiner

METHOD AND SYSTEM FOR SEARCHING FOR A WEB DOCUMENT

CROSS-REFERENCE TO RELATED APPLICATIONS

This application claims priority under 35 U.S.C. §119 to Chinese Patent Application No. 201110198627.9 filed Jul. 15, 2011, the entire text of which is specifically incorporated by reference herein.

TECHNICAL FIELD

The present invention generally relates to the field of information processing technology, more particularly, to a method and system for searching for a web document.

BACKGROUND

With the rapid development and maturation of Web 2.0 technology, users are more active on the Internet than ever. Traditionally, Web contents are created by Web professionals. Nowadays, the majority of Web contents are contributed by a vast number of Web users, who can share useful information through various forms, e.g., tags, comments, questions, answers or votes. Meanwhile, more dynamic web technologies (e.g., JavaScript, Flash, JSP or ASP, HTML 5, etc.) have been or will be widely used during the development of Web 2.0 technology. Taking the Internet standard HTML 5 as an example, the predecessor of the HTML 5 draft is Web Application 1.0. It was proposed by WHATWG in 2004, and was accepted by W3C in 2007, and a new HTML task force was established. The first formal draft was published on Jan. 22, 2008. HTML 5 has two features: first, it enhances the representation performance of Web pages; besides being able to depict two-dimensional graphics, it has also prepared tags for playing videos and audios. Secondly, it is added with functions of Web applications such as local database. HTML 5 is not only for representing Web contents, rather, its mission is to bring the Web into a mature application platform on which videos, audios, images, animations and interactions with computers are all standardized (for more information, refer to www.w3.org/TR/html5//, www.html5.cn, etc.).

The development of dynamic web contents technologies presents great challenge to the search engine technology, since the current search engine technology is mainly directed to static web pages. In order to also search for dynamic web pages, the current search engine technology attempts to solve such a problem by recommending to web authors to use a standard platform. For example, the search engine corporation Baidu (Baidu is a trademark of the Baidu Corporation) has a program named Aladdin, which is an all-purpose open platform proposed by Baidu. It opens interfaces to owners of unique information data, so as to solve the problem that existing search engines are unable to capture and retrieve hidden web information. However, users may not want to use such a platform or similar technology to create web pages, and there will still be massive information that cannot be retrieved by the existing search engines.

BRIEF SUMMARY

In one aspect of the present invention, a method for searching for a web document is provided. The method includes receiving user's search request; searching for a web document related to the search request based on a web document index; determining a move path for accessing the web document based on a move path index of the web document; and sending the move path for accessing the web document to the user.

Besides the traditional content index, the method of the present invention can first record and index the move path for obtaining dynamic contents. Then, during the search phase, the move path will be returned to the client together with the search result or according to the user's request. Finally, the client system may automatically locate the user's desired dynamic contents display status based on the move path. Therefore, it may help the search engine to retrieve contents that are difficult to be retrieved previously.

BRIEF DESCRIPTION OF THE DRAWINGS

Features and advantages of embodiments of the present invention are described in detail with reference to the following accompanying drawings. If possible, the same or similar reference signs are used in the accompanying drawings and description to denote the same or similar elements, wherein.

DETAILED DESCRIPTION

Now detailed description is presented by referring to exemplary embodiments of the present invention, and examples of the embodiments are illustrated pictorially in the accompanying drawing, wherein the same reference signs always denote the same elements. It should be appreciated that the present invention is not limited to the disclosed exemplary embodiments. It should be further appreciated that not every feature of the method and device is necessary for implementing the present invention as claimed by any one of the claims. In addition, in the entire disclosure, when a processing or method is illustrated or described, the steps of the method can be executed in any sequence or simultaneously, unless it can be clearly seen from the context that one step depends on another step executed previously. Further, the steps may have substantial time intervals there between.

Figure 1:
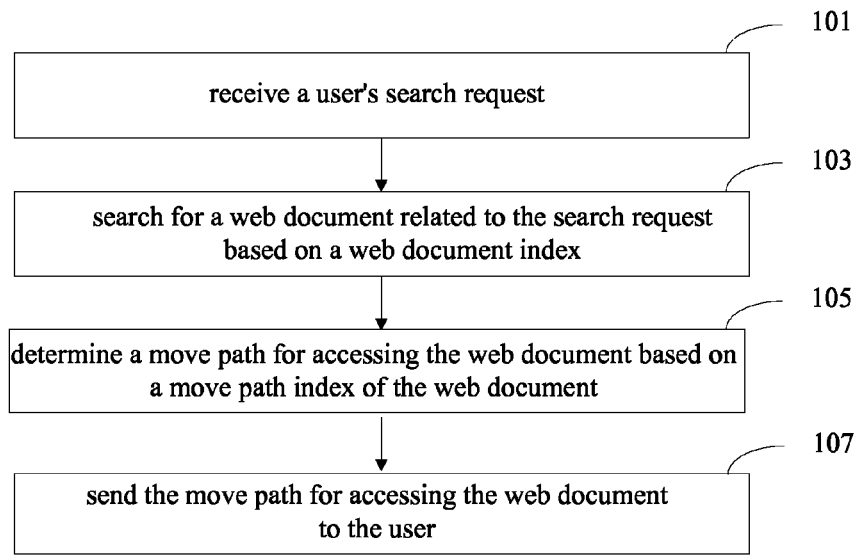
FIG. 1 shows a first specific embodiment of a method for searching for a web document of the present invention.

FIG. 1 shows a first specific embodiment of a method for searching for a web document of the present invention. In the method, at step 101, a user's search request is received. At step 103, a web document related to the search request is searched for based on a web document index. Before receiving the user's search request, the search engine would create a move path index and a web document index of a corresponding web document. The move path refers to a detailed path record of the movement of a user interface element such as a cursor or the like on the web page caused by a user using a user interface input tool such as a mouse or by an automatic program, etc., and operations such as stopping or clicking of the user interface element performed on the web document when it moves to a specific position. Creating a web move path index comprises obtaining the move path of accessing a web document, and creating a move path index for the web document. There are various methods to obtain the move path of a web document, and here two methods are given as examples: the first method is to obtain the corresponding move path and the response position by simulating clicking on the web page. For example, the Web page is first loaded into a browser, and then a screenshot is made there from and potential clickable areas are analyzed, which may be realized automatically by using a program. The screenshot may be made by using the existing method of Java, java.swt.Robot.createScreenCapture. After making the screenshot, each pixel point in the screenshot is grouped. The grouping rule is that, if the color of a pixel is similar to that of an adjacent pixel (e.g., within two pixel points), then the two pixel points are placed in a same group. After this step, the size of each group is determined, which is calculated by the positions of the uppermost, lowermost, leftmost and rightmost pixel points. If the size of group is within a certain range, e.g., between 2×2 and 50×50, then it is considered that the group might represent a character on the web page. Then the groups of which the sizes meet requirements are merged by distance, and the method may be that those groups with a horizontal distance less than a certain value are merged into one group. After this step, the size of each group is determined once again. If the size is within a certain range, e.g., between 15×5 and 500×50, then the group might be a clickable area. Based on the analysis result, a real mouse is moved in the browser and a corresponding region is clicked on, which step can be realized by a software method, e.g., the existing method of Java, java.swt.Robt. mouseMove, mousePress and mouseRelease, and the like; meanwhile, the click path is recorded and the corresponding HTTP request and return result are tracked through a HTTP proxy. The above operations can be performed iteratively until there are no new clickable areas, The second method of obtaining the move path of a web document is to obtain a corresponding move path and response position by analyzing and executing specific code. For example, the method proposed in WO2010/114913A1 obtains the page contents in each different status by analyzing JavaScript functions. Specifically, it first obtains the source code the web page, then obtains the JavaScript information therein, and then analyzes the JavaScript to determine functions including Ajax invocation, and obtains the corresponding web contents by triggering the functions. The triggering positions on the web page to which these JavaScript functions correspond may also be obtained by analyzing the source code of the web page: since the links in a web page are generated by the source code in the web page, and if it is desired to obtain the links, the code in the web page must be executed or analyzed. There may be two possible outcomes if the code in a web page is executed: one is to generate clickable links (the A tags of HTML) on the web page, in which case it may not be possible to obtain the links by means of analysis; the other is to directly obtain the contents of the link by AJAX invocation after the code generated the link. Since the method of AJAX invocation is relatively fixed (through XMLHttpRequest or ActiveXObject object), the functions directly invoking AJAX can be found by analyzing the code. A web page link may be generated in multi-level function invocations and passed to an AJAX function. If the invocation levels are clear and do not depend on external variables and inputs, then the link may be calculated by means of analysis, so as to obtain the specific click positions of all the functions. In an aspect of the present invention, the web page may be a dynamic web page, which is at least one of dynamic web pages developed by using technologies such as JavaScript, Flash, JSP or ASP, HTML 5 or other future dynamic web page tools. In the following will be described how to create a move path index based on an obtained move path through specific examples.

Creating a web document index further comprises obtaining the move path for accessing the web document; obtaining the web document based on the move path; and creating a web document index for the web document. The web document can be accessed through the move path of the web document. After the contents of the web document are obtained, an index can be created for the web document according to existing document indexing technology. Those skilled in the art will know that creating an index for a known web document is a mature technology. For example, when there are documents T0="it is what it is", document T1="what is it" and document T2="it is a banana", they may be indexed as "a": {2}, "banana": {2}, "is": {0, 1, 2}, "it" {0, 1, 2}, "what": {0, 1}, wherein "a": {2} denotes that the word "a" appears in document T2. An Inverted index is "an index data structure storing a mapping from content, such as words or numbers, to its locations in a database file, or in a document or a set of documents." Inverted index, wikipedia.org (23 Jun. 2011).

At step 105, the move path accessing the web document is determined based on the move path index of the web document. Since the move path of the web document that needs to be accessed has been indexed previously, according to the searched web document which the user desires to access, the move path corresponding to the web document can be determined by using the move path index. The user can access the web document by using the move path. At step 107, the move path for accessing the web document is sent to the user.

Generally, an existing search engine will return a search result with a summary of the web document (web page snapshot) to the user. Then as a second specific embodiment of a method of the present invention, the sending the move path for accessing the web document to the user may be to include the move path in the search result sent to the user, that is, to send to the user the search result together with the move path included in the search result; or it may be contemplated to send the move path separately when sending the search result, that is, to send the move path in response to sending the search result to the user. The move path may either be visible or invisible to the user; being visible means that the move path is included in the search result and displayed to the user. The web browser at the client may be added with a Robot/browser plugin, which can identify and parse the move path. Taking the solution in which the move path is invisible to the user as an example, the move path may be included in a HTML hidden tag (display=none in the style), which is not displayed on the web page, but the contents of which the plug-in can still detect. Of course, in the case of being visible, the browser plug-in can also identify the move path. When the user clicks in the search result, the browser will first jump to a page of the search engine to record the user's click, and then jumps to the actual search result page. If the user has installed the browser plug-in, when the browser plug-in detects that browser attempts to jump to the recording page of the search engine, the browser plug-in will scan the current page (i.e., the search result page); if the item clicked by the user in the search result includes the specific hidden tag, the plug-in will, after the search result page is opened, perform a series of clicks on the search result page according to the command specified by the tag to make it jump to the user's desired web document (web page status).

Figure 2:
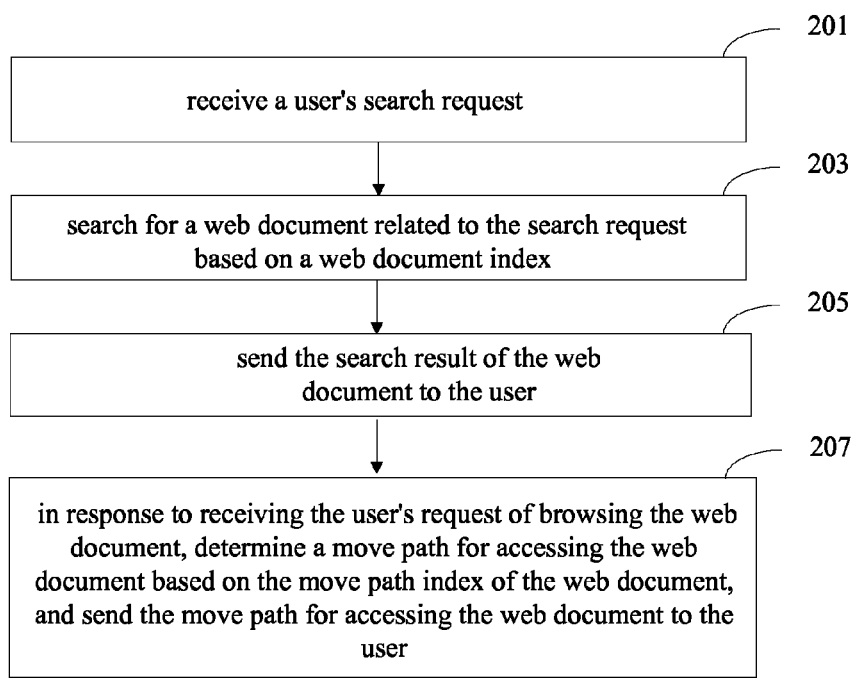
FIG. 2 shows another specific embodiment of a method for searching for a web document of the present invention.

FIG. 2 shows a third specific embodiment of a method for searching for a web document of the present invention. In the method, at step 201, a user's search request is received; at step 203, a web document related to the search request is searched for based on a web document index. At step 205, a search result of the web document is sent to the user. At step 207, in response to receiving the user's request of browsing the web document, the move path for accessing the web document is determined based on the move path index of the web document, and the move path for accessing the web document is sent to the user. In this application scenario, the user's request to browser the document will first be sent by the web browser to the search engine sever, and the search engine server will search for the move path index to which the web document corresponds and determine the corresponding move path, and then the search engine server will send to the web browser the move path, based on which the web document can be accessed.

Figure 3:
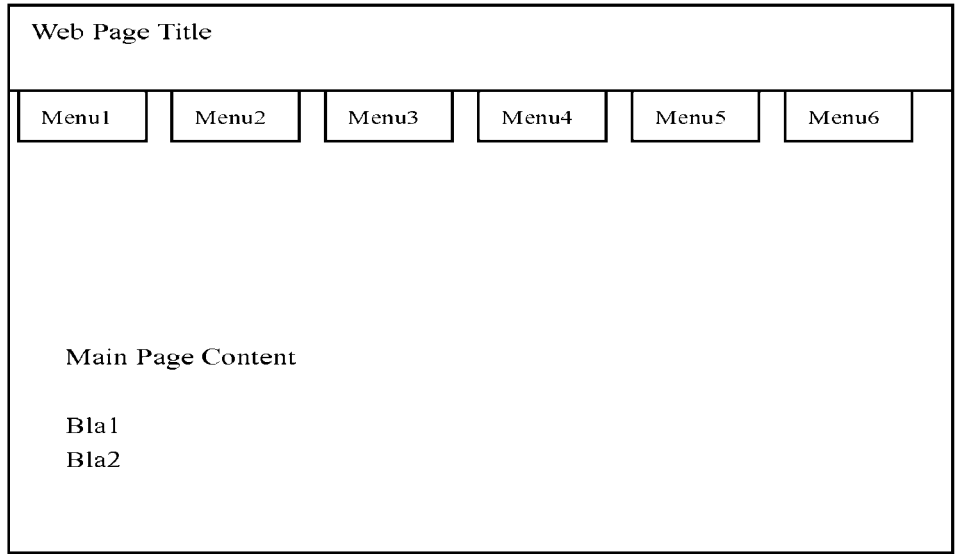
FIGS. 3 and 4 show a method for creating a web document index and a move path index of the present invention.
Figure 4:
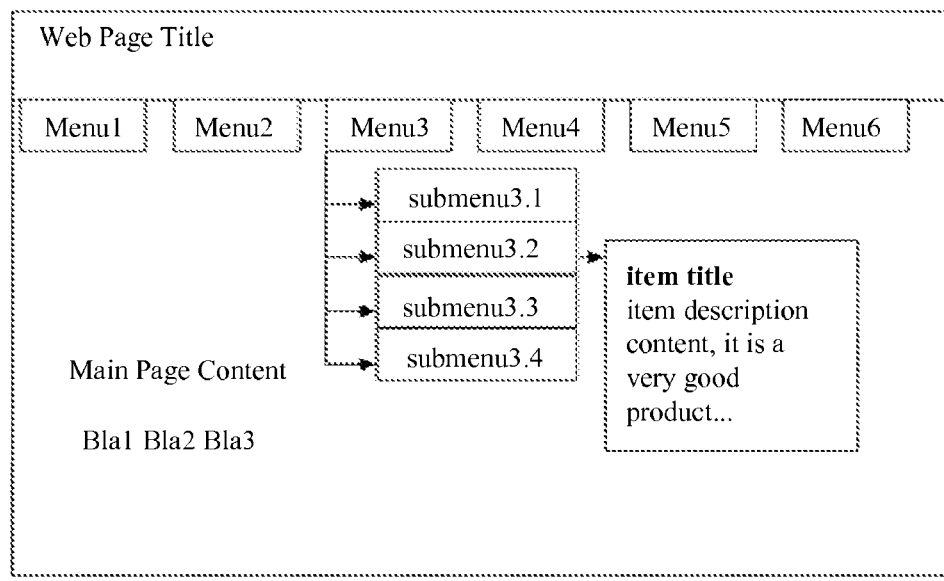

FIGS. 3 and 4 show an example of how to obtain the move path and create the dynamic web document index as well as the move path index. Suppose there is the following dynamic web page, http://abc.com/def, as shown in FIG. 3. Since the web document (contents) to which the tags such as Menu1 correspond can only be browsed by clicking, an existing search engine is unable to obtain the contents of the entire page, and typically can only capture the page contents as follows:

Document 1: Main Page Title Menu1 Menu 2 Menu 3 Menu4 Menu 5 Menu 6 Main Page Content Bla1 Bla2 Bla3.

Based on the traditional technology of document content indexing, the following reverse index can be obtained:
"main": {Document 1}
"page": {Document 1}
"title": {Document 1}
"menu 3" {Document 1}
"bla3" {Document 1}

The new method proposed by the present invention lies in that:

by using at least one method of simulating clicking on the web document and analyzing and executing specific code of the web document, a page can be created for each web page status (web document). In the following the page contents to which Menu3 corresponds will be taken as an example. Suppose the dynamic contents of the page are displayed as follows:

the document contents to which the status corresponds are:
MovePath (move path): M (400, 80): Click (M(400, 80)) denotes moving to the web page position with a pixel coordinate of (400, 80), Click denotes performing left key click of the mouse at the current position.)
Document1-DynmicStatus3: menu3 submenu3.1 submenu3.2 submenu3.3 submenu3.4

It may be supposed that the contents of submenu 3.2 being clicked are as follows (submenu3.1 is omitted from above, assuming it has no substantive document contents):
MovePath: M(400, 80): Click→M (400, 112): Click
Document1-DynamicStatus3.2: item title, item description content, it is a very good product.

Also, it may be supposed that the contents of submenu 3.3 being clicked are as follows:

MovePath: M(400,80):Click→sM(400, 122):Click
Document1-DynamicStatus3.3 item title, item description content, there are many gifts available.

It may be supposed that the contents of submenu 3.4 being clicked are as follows:
MovePath: M(400,80): Click→M(400, 132): Click
Document1-DynamicStatus3.4 item title, item description content, payment instructions wherein Document1-DynamicStatus 3.2 denotes the identification of the page contents to which submenu 3.2 corresponds. Of course, those skilled in the art may choose various identifications as appropriate based on the present application, and here this is merely used as an example. Here "item title" is a general designation. Based on the above dynamic status contents, we can create indexes based on a plurality of virtual documents for the dynamic web page, http://abc.com/def, as follows:

--- web document index:
"main": {Document1}
"page": {Document1}
"title": {Document1, Document1-DynamicStatus3.2, Document1-DynamicStatus3.3, Document1-DynamicStatus3.4}
......
"menu3": {Document1, Document1-DynamicStatus3}
"bla3": {Document1}
......

--- and create move path indexes according to the move paths corresponding to the web documents:

---

......
Document1-DynamicStatus3 : MovePath: M(400,80):Click
Document1-DynamicStatus3.2: MovePath: M(400,80):Click M(400, 112):Click
Document1-DynamicStatus3.3: MovePath: M(400,80):Click M(400, 122):Click
Document1-DynamicStatus3.4: MovePath: M(400,80):Click M(400, 132):Click
......

---

The association between the move path indexes and the web document indexes lies in web documents, e.g., "title" appears in the web document Document-DynamicStatus3.2, and the move path (index) to which the DynamicStatus3.2 corresponds is "Document 1-DynamicStatus3.2: MovePath: M(400,80):Click M(400, 112) :Click".

Further, according to the layered structure of MovePath, the above indexes can be further optimized as (e.g., replacing some specific click path with a context document):

---

......
Document1-DynamicStatus3 : M(400,80):Click
Document1-DynamicStatus3.2: Document1-DynamicStatus3 → M(400, 112):Click
Document1-DynamicStatus3.3: Document1-DynamicStatus3 → M(400, 122):Click
Document1-DynamicStatus3.4: Document1-DynamicStatus3 → M(400, 132):Click
......

---

The above structure can be used to quickly find the path result when the key word fall within two virtual documents respectively: for example, when the user inputs the key query words, submenu 3.2+item title, the corresponding virtual documents are: Document1-DynamicStatus3 and Document1-DynamicStatus3.2, respectively. However, since Document1-DynamicStatus3 already appears in the move path of Document1-DynamicStatus3.2, due to the association of the move paths, the document Document1-DynamicStatus 3.2 can be quickly returned from the above move path indexes to respond to the user's search requirement, without need to send the two move paths to the user. However, in searching of move paths, the association is mainly through web documents.

The web document indexes and the move path indexes are associated through web documents, and the web document indexes and the move path indexes may be stored separately. Of course, it may also be contemplated to merge the two index tables into one index table according to the identifications of web documents, such that the move path of a web document can be searched out together while the web document is searched for.

Figure 5:
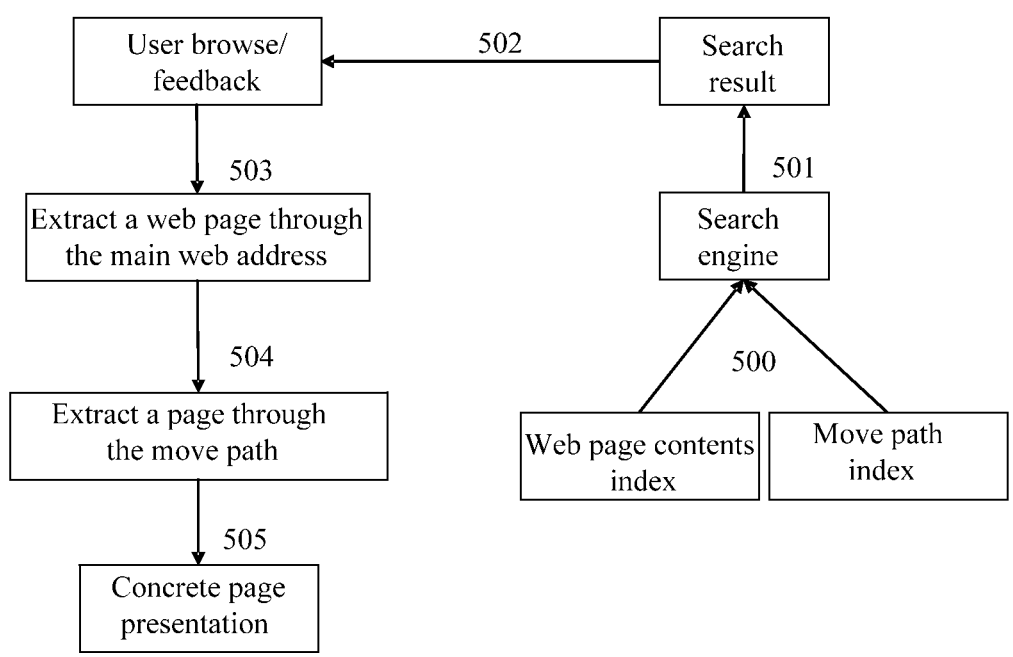
FIG. 5 shows another specific embodiment of a method for searching for a web document of the present invention.

FIG. 5 shows a fourth specific embodiment of a method for searching for a web document of the present invention. In this specific embodiment, the interaction process between the search engine server and the user browser of the method of the present invention is described in detail. At step 500, the web document index and the move path index of the web document have been created according to the method described above. At step 501, the search engine server presents the search result to the user browser according to user's request and sends the move path to the user. At step 502, the user brows the search result and inputs a feedback into the user browser. At step 503, the user browser extracts the main web page from the content server according to the user feedback and the main web address provided by the search engine. At step 504, the user browser extracts the target page of the web page according to the move path provide by the search engine, and finally at step 505, presents the target page on the user browser. In addition, those skilled in the art will understand according to the present invention that it is also a feasible solution that the search engine sends the main page web address and the move path after obtaining the user's selection feedback.

Figure 6:
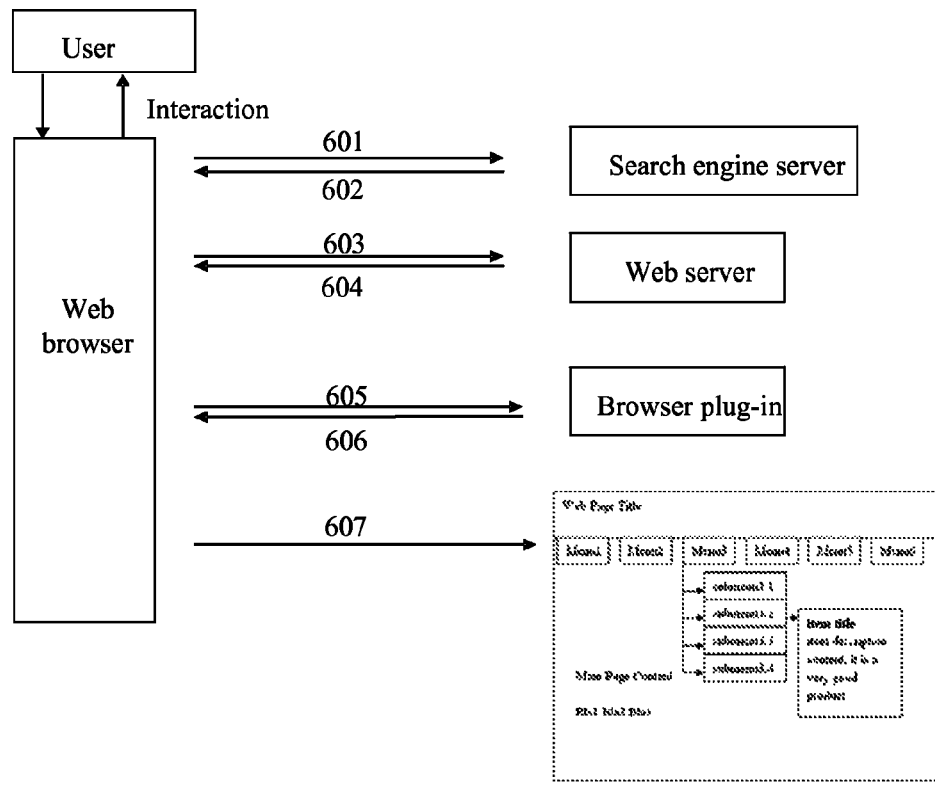
FIG. 6 shows another specific embodiment of a method for searching for a web document of the present invention.

FIG. 6 shows a fifth specific embodiment of a method for searching for a web document of the present invention. In this specific embodiment, the interaction process between the search engine server, the user browser and the web document server etc. of the method of the present invention is described in detail. At step 601, the user initiates a search request to the search engine server through the web browser, and the search engine server returns the search results (a catalog with abstracts) and move paths of web documents to the web browser in response to the search request (of course, the move path may also be retrieved and sent by the search engine server in response to the user's selection when the user really needs to browse a web document). At step 603, the user selects a search result and requests the web server to provide the corresponding contents. At step 604, the web server, in response to the request, returns the web page corresponding to the main address of the web document to the web browser. At step 605, the move path may be sent to the browser plug-in (Robot) by the browser, or the browser plug-in directly monitors the actions of the browser and obtains the move path as needed. Based on the move path, the browser plug-in can use the above-described simulating clicking technology to perform corresponding operations such as moving and clicking on the web page. At step 606, after finishing operations such as moving and clicking, the browser plug-in leaves the operation result to the web browser. At step 607, the web browser presents the target page.

Figure 7:
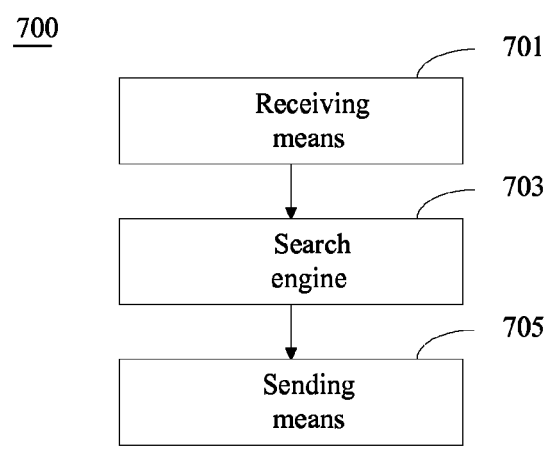
FIG. 7 shows a structural block diagram of a system for searching for a web document of the present invention.

FIG. 7 shows a structural block diagram of a system for searching for a web document of the present invention. The system 700 for searching for a web document comprises: receiving means 701 configured to receive a user's search request; a search engine 703 configured to search for a web document related to the search request based on a web document index, and determine a move path for accessing the web document based on a move path index of the web document; and sending means 705 configured to send the move path for accessing the web document to the user. The related methods involved in the above means have been described in great detail above, and are not repeated here.

According to another aspect of the present invention, the sending the move path for accessing the web document to the user is to send the move path in response to sending the search result to the user.

According to another aspect of the present invention, the determining a move path for accessing the web document based on a move path index of web document and sending the move path for accessing the web document to the user is performed by the search engine in response to receiving the user's request of browser the web document.

According to another aspect of the present invention, the system 700 for searching for a web document further comprises: move path obtaining means configured to obtain the move path of the web document; and move path index creating means configured to create the move path index of the web document.

According to another aspect of the present invention, system 700 for searching for a web document further comprises: move path obtaining means configured to obtain the move path of the web document; web document index creating means configured to obtain the web document based on the move path and create the web document index for the web document.

According to another aspect of the present invention, the obtaining the move path of the web document comprises obtaining the move path by at least one of simulating clicking on the web document and analyzing and executing specific code of the web document.

According to another aspect of the present invention, the system 700 for searching for a web document further comprises: web document obtaining means configured to simulating clicking by a browser plug-in until obtaining the web document based on the move path.

According to another aspect of the present invention, the web page is a dynamic web page.

Figure 8:
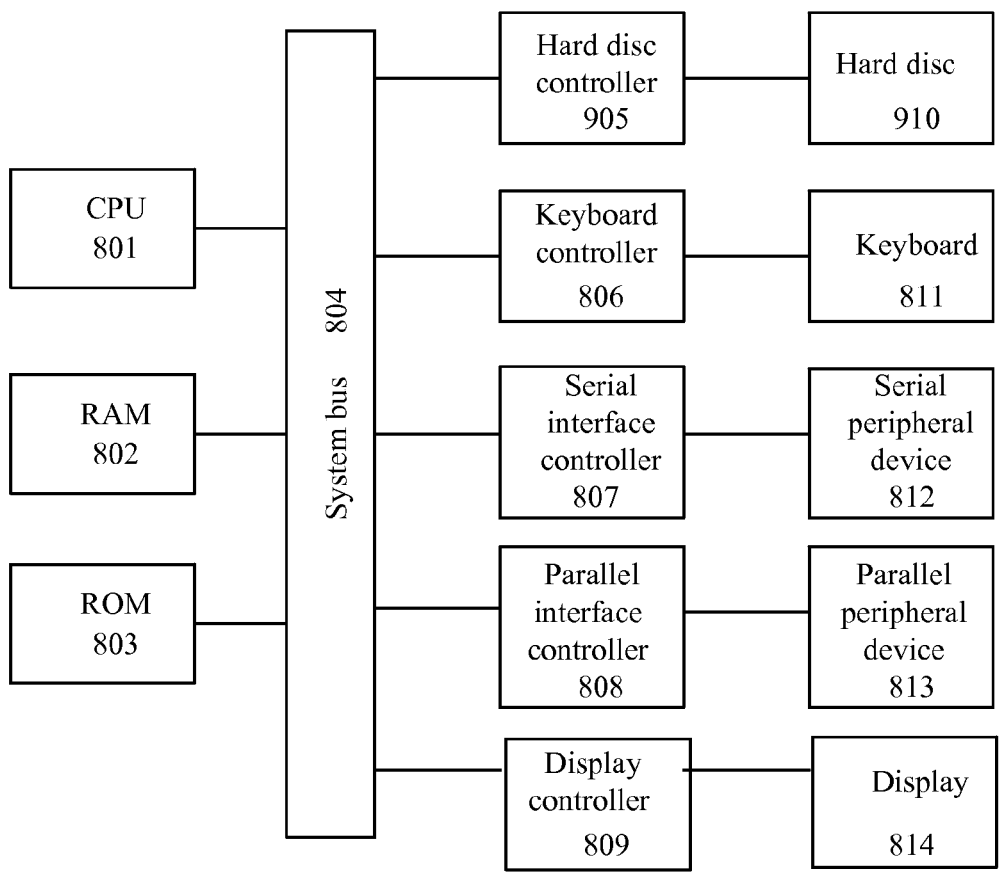
FIG. 8 schematically shows a structural block diagram of a computing device that can realize an embodiment of the present invention.

FIG. 8 schematically shows a structural block diagram of a computing device that can realize an embodiment of the present invention. The computer system shown in FIG. 8 comprises a CPU (central processing unit) 801, RAM (random access memory) 802, ROM (read-only memory) 803, system bus 804, a hard disc controller 805, a keyboard controller 806, a serial interface controller 807, a parallel interface controller 808, a display controller 809, a hard disc 810, a keyboard 811, a serial peripheral device 812, a parallel peripheral device 813 and a display 814. In these components, the CPU 801, RAM 802, ROM 803, hard disc controller 805, keyboard controller 806, serial interface controller 807, parallel interface controller 808 and display controller 809 are connected with the system bus 804. The hard disc 810 is connected with the hard disc controller 805; the keyboard 811 is connected with the keyboard controller 806; the serial peripheral device 812 is connected with the serial interface controller 807; the parallel peripheral device 813 is connected with the parallel interface controller 808, and the display 814 is connected with the display controller 809.

The functions of each component in FIG. 8 are well known in the art, and the structure shown in FIG. 8 is also conventional. Such a structure is not only suitable for a personal computer, but also for a hand-held device, e.g., Palm PC, PDA (personal digital assistant), mobile phone, etc. In different applications, e.g., when implementing a user terminal comprising a client module according to the present invention or a server host comprising a network application server according to the present invention, some components may be added to the structure shown in FIG. 8, or some components in FIG. 8 may be omitted. The entire system shown in FIG. 8 is usually controlled by computer readable instructions stored as software in the hard disk 810 or in EPROM or another non-volatile storage. The software can also be downloaded via a network (not shown), or stored in the hard disk 810, or the software downloaded via the network may be loaded into the RAM 802 and executed by the CPU 801, so as to accomplish the functions defined by the software.

Although the computer system described in FIG. 8 may support the technical solution provided by the present invention, this computer system is only an example of computer systems, and those skilled in the art will appreciate that many other computer system designs can also realize embodiments of the present invention.

Another example embodiment of the present invention is a system for searching for a web document. The system includes a receiver configured to receive a user's search request, a search engine configured to search for a web document related to the search request based on a web document index and to determine a move path for accessing the web document based on a move path index of the web document, and a sender configured to send the move path for accessing the web document to the user. In one embodiment, the sender sends the move path for accessing the web document to the user in response to sending the search result to the user. In one embodiment, the search engine determines the move path for accessing the web document based on the move path index of the web document in response to the user's request of browsing the web document, and the sender sends the move path for accessing the web document to the user in response to the user's request of browsing the web document. In one embodiment, the system includes a move path obtainer configured to obtain the move path for accessing the web document, and a move path index creator configured to create the move path index of the web document. The move path obtainer may obtain the move path by at least one of simulating clicking on the web document and analyzing and executing specific code of the web document. The system may include a move path obtainer configured to obtain the move path for accessing the web document, and a web document index creator configured to obtain the web document based on the move path, and to create the web document index for the web document. In one embodiment, the system includes a web document obtainer configured to obtain the web document by simulating clicking of a browser plug-in based on the move path. In one embodiment, the web page is a dynamic web page.

Although exemplary embodiments of the present invention are described herein by referring to the accompanying drawings, it will be understood that the present invention is not limited to the specific embodiments. And, those of ordinary skill in the art can make various changes and modifications to the embodiments of the present invention without departing from the scope and spirit of the present invention. All the changes and modifications are intended to be included in the scope of the present invention defined by the appended claims.

And from the above description, those skilled in the art will appreciate that the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in a medium of expression having computer readable program code embodied thereon.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations in embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for searching for a web document, comprising:
   receiving a user's search request;
   searching for a web document related to the search request based on a web document index;
   determining a movement path of a mouse for accessing the web document based on a movement path index of the mouse for the web document;
   sending the movement path of the mouse for accessing the web document to the user;
   displaying the web document and the movement path of the mouse for accessing the web document; and
   obtaining the web document by simulating clicking of the web browser based on the movement path of the mouse.

2. The method of claim 1, wherein the sending the movement path of the mouse for accessing the web document to the user includes sending the movement path of the mouse in response to sending the search result to the user.

3. The method of claim 1, wherein the determining the movement path of the mouse for accessing the web document based on the movement path index of the mouse for the web document and sending the movement path of the mouse for accessing the web document to the user are performed in response to the user's request of browsing the web document.

4. The method of claim 1, further comprising:
   obtaining the movement path of the mouse for accessing the web document; and
   creating the movement path index of the mouse for the web document.

5. The method of claim 4, wherein the obtaining the movement path of the mouse for accessing the web document comprises obtaining the movement path of the mouse by at least one of simulating clicking on the web document and analyzing and executing specific code of the web document.

6. The method of claim 1, further comprising:
   obtaining the movement path of the mouse for accessing the web document;
   obtaining the web document based on the movement path of the mouse; and
   creating the web document index for the web document.

7. The method of claim 1, wherein the web page is a dynamic web page.

8. The method of claim 1, wherein determining the movement path of the mouse for accessing the web document based on the movement path index of the mouse for the web document includes determining a path record of movement of a user interface element caused by a user using a user interface input tool.

9. The method of claim 1, wherein the movement path includes pixel coordinates of the mouse on the web document.

* * * * *